(12) United States Patent
Frei et al.

(10) Patent No.: US 6,227,348 B1
(45) Date of Patent: May 8, 2001

(54) METHOD AND APPARATUS FOR SEPARATING AND BRINGING TOGETHER SERIES OF CONTAINER BODIES

(75) Inventors: Mathias Frei, Neuenhof; Peter Bässler, Bellikon; Peter Schreiber, Ipsach; Peter Taiana, Staffelbach, all of (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/117,325

(22) PCT Filed: Jan. 24, 1997

(86) PCT No.: PCT/CH97/00021

§ 371 Date: Nov. 23, 1998

§ 102(e) Date: Nov. 23, 1998

(87) PCT Pub. No.: WO97/27132

PCT Pub. Date: Jul. 31, 1997

(30) Foreign Application Priority Data

Jan. 26, 1996 (CH) ............................................ 206/96

(51) Int. Cl.[7] .................................................. B65G 47/26
(52) U.S. Cl. ........................................ 198/439; 198/370.13
(58) Field of Search .......................... 198/370.12, 370.13, 198/438, 439, 448

(56) References Cited

U.S. PATENT DOCUMENTS

| 2,743,001 | * | 4/1956 | Nordquist | 198/439 |
| 2,920,739 | * | 1/1960 | Woldin | 198/439 |
| 3,167,168 | * | 1/1965 | Park | 198/439 |
| 3,285,386 | * | 11/1966 | Gorman | 198/439 |
| 3,596,761 | * | 8/1971 | Campbell | 198/439 |
| 3,679,049 | * | 7/1972 | Kilner | 198/439 |
| 3,731,782 | * | 5/1973 | Del Rosso | 198/439 |
| 3,807,314 | * | 4/1974 | Slemmons | 198/370.13 |
| 4,618,052 | * | 10/1986 | Rickett et al. | 198/439 |
| 5,190,136 | * | 3/1993 | Grecksch et al. | 198/439 |

FOREIGN PATENT DOCUMENTS

| 1 611 843 | 1/1971 | (DE) . |
| 92 01 426 | 6/1992 | (DE) . |
| 2 114 083 | 8/1983 | (GB) . |

* cited by examiner

*Primary Examiner*—Douglas Hess
(74) *Attorney, Agent, or Firm*—McCormick, Paulding & Huber, LLP

(57) ABSTRACT

In order to separate can bodies carried by a first conveyor belt at a high speed, a second conveyor belt is taken close to the first conveyor belt and individual bodies are transferred from the first conveyor belt to the second conveyor belt. It is thus possible to separate a sequence of tin bodies into two sequences, thus facilitating further processing. The process can also be reversed to form a single sequence of bodies from two sequences.

13 Claims, 3 Drawing Sheets

METHOD AND APPARATUS FOR SEPARATING AND BRINGING TOGETHER SERIES OF CONTAINER BODIES

BACKGROUND OF THE INVENTION

1. Technical Field

The invention relates to the handling of container bodies and in particular to a method and an apparatus for separating a series of container bodies, and methods and apparatus for bringing container bodies together.

2. State of the Art

As is known, container bodies, and in particular can bodies, are transported on conveyor belts with the body lying or suspended in the prone position, and subsequently have to be turned through 90° for further processing, so that the can body is carried onwards in the upright position. FIG. 1 shows, highly schematically, an apparatus for carrying out this manoeuvre. A series of can bodies 2, of which only four are shown, are transported on a first conveyor belt 1, at a speed V1, and with a gap of approximately 3 to 4 mm between the can bodies. At this stage the can bodies are held on the conveyor belt e.g. by permanent magnets. The can bodies are to pass on to a further conveyor belt 4 on which they are stood upright in order to undergo further processing in a known manner. The can bodies cannot be transferred directly from the conveyor belt 1 to the conveyor belt 4, as the gap between the can bodies is so small that this would result in collision between successive can bodies. Another conveyor belt 3 is therefore interposed between the conveyor belt 1 and the belt 4, and is run at a speed V2 which is higher than the speed V1. This results in an increased gap between the can bodies on the belt 3, as the figure shows. Each can body 2 arriving at the conveyor belt 4 is then at a sufficient distance from the next can body to allow it to be picked up and conveyed away by the conveyor belt 4 before the next body lands the belt 4. The arrangement in FIG. 1 is highly schematic, and is shown without the known means for fixing the can bodies e.g. to the belt 4. The can bodies are held on the conveyor belts 1 and 3 preferably by magnetic force, as has already been mentioned, and as is also known.

Because machines used for the fabrication of can bodies, especially roller seam welding machines, are capable of operating at ever-increasing speeds, the problem arises that the speed V1 is already very high. For example it may be that 1000 bodies per minute are being transported on the conveyor belt 1, which means that the conveyor belt has to be travelling at high speed. Because the speed V2 of the belt 3 must be higher than the speed V1 in order to increase the gap between the can bodies, the resulting speed V2 is so high that transfer to the conveyor belt 4 becomes problematic, as the can bodies impinge on the conveyor belt 4 at high speed. U.S. Pat. No. 5,423,410 proposes, as a way of solving the problem, that the stream of cans be separated into two streams, using two parallel conveyor belts lying in the same plane. A transfer device pushes individual can bodies from one belt on to the other parallel belt. The can body has to traverse a relatively large distance in making this transfer, and the transfer from one belt to the other is made abruptly, which may cause damage to the body. On the one hand there is therefore the aim of providing a method and/or an apparatus whereby can bodies, even if conveyed at a rapid rate, can be divided between two or more belts, without any problem, and in the gentlest possible manner, for further processing.

Furthermore, some of the can bodies transported at a rapid rate on the conveyor belt 1 may need to be removed from the conveyor belt because they have been identified as defective by a quality control system. These bodies must be sent on for further processing. A known solution is to eject such bodies from the conveyor belt 1 e.g. by a jet of air. The result is that the ejected body leaves the belt at high speed, in an uncontrolled manner. If for example ejection takes place before the inner coating of the can body has dried, this ejection from the conveyor line causes coating powder or coating lacquer to be dispersed over the surrounding area, which is undesirable. Therefore, there is the further problem of providing a method and an apparatus by means of which individual can bodies may be removed, in a controlled manner, and in the gentlest possible way, from the series of can bodies being transported on a conveyor belt 1. GB-A 2114083 discloses a can body switch in which the stream of bodies is divided at a break-point of the conveyor belt by means of electromagnets arranged on either side. This arrangement is expensive, and at high rates of transfer may lead to malfunctions due to the absence of a positive grip and to high centrifugal forces.

SUMMARY OF THE INVENTION

The problems stated can be solved using a method and/or an apparatus in which a second conveyor is operated at substantially the same speed as a first conveyor carrying a series of can bodies, and is made to pass close to the first conveyor means along a section of conveyor path and then diverges therefrom, such that the conveying plane of one conveyor means does not coincide with the conveying plane of the other conveyor means at least in the said section of conveyor path. By means of a controllable application of force, individual bodies are transferred from the first conveyor means to the second conveyor means, on which the bodies are held and are successively removed from the series by the divergence of the path of the second conveyor means from the first conveyor means. The first conveyor means is formed by a first conveyor belt extending in a straight line in the region of separation, and is characterized in that the bodies are held on the first conveyor belt by permanent magnets or mechanically. The second conveyor is formed by a second conveyor belt behind which a plurality of electromagnets or permanent magnets are arranged one after the other in the conveying direction. The electromagnets are actuated by a control unit so that the force tending to hold the bodies on the first conveyor belt is overcome or so that the bodies are transferred to the permanent magnets of the second conveyor belt by controlled application of mechanical force so that the holding force of the first conveyor belt is overcome. Thereby individual bodies are caused to be transferred to the second conveyor belt.

The problems can be solved by providing the second conveyor means which initially extends close to the first conveyor means but in a different plane and is able to accept can bodies from the first conveyor means. The second conveyor means may thereby contact or almost contact the can bodies to be transferred, so that practically no displacement of the bodies by application of force is necessary, and the bodies are gently removed in succession from their original series through the divergence of the second conveyor means.

On the one hand, a stream of e.g. 1000 container bodies per minute can be divided into two streams of 500 container bodies per minute in this way, and each of these two streams can be fed separately to a conveyor belt for standing the can bodies upright. This eliminates the need for a transfer belt 3 travelling at increased speed. On the other hand, the method and/or apparatus according to the invention can be used for removing particular bodies from a series of container bodies in a controlled manner so that there is no risk of bodies flying about or of contamination with coating powder or coating lacquer when removal occurs.

The reverse function may also be desired. Say a single stream of bodies is to be formed from a number of such streams. This problem is solved by the method and apparatus in which one conveyor means carrying one stream of container of bodies is made to pass close to another conveyor means carrying another stream of container bodies along a section of conveyor path, such that the conveying plane of one conveyor means does not coincide with the conveying plane of the other conveyor means at least in the said section of conveyor path. By means of a controllable application of force individual bodies are transferred from one conveyor means to the other conveyor means, on which these bodies are held. One conveyor means is formed by a conveyor belt. The bodies are held on one conveyor means by permanent magnets and the other conveyor means is formed by a second conveyor belt behind which a plurality of electromagnets are arranged. The electromagnets are actuated by a control unit so that the holding force of the permanent magnets is overcome, causing the bodies to be transferred to the second conveyor belt. This solution is based on the same principle as that proposed for dividing a stream.

The object can also be achieved by a method and apparatus in which the bodies are guided on to a single belt-form conveyor means provided with controllable V-shaped holding devices for the bodies, the holding devices being divergent for separating the bodies or convergent for bringing the bodies together and controlled so that the bodies are separated or brought together as the case may be. The holding devices are formed by magnetic holding means arranged underneath the conveyor means.

BRIEF DESCRIPTION OF THE DRAWINGS

The invention will now be explained in more detail with reference to embodiments showing the advantages which have been described and also further features. In the drawings.

DESCRIPTION OF THE PREFERRED EMBODIMENTS

Figure 1:
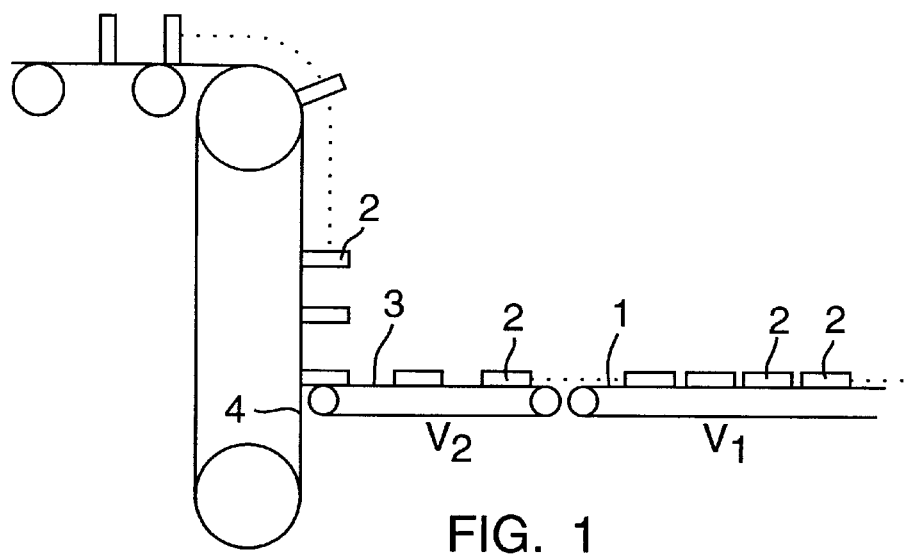
FIG. 1 shows an arrangement for transferring can bodies and standing them upright in accordance with the state of the art, in a highly schematic representation.

FIG. 1 shows—as already described—a conventional arrangement for conveying a series of can bodies to a conveyor belt 4 on which the bodies are stood upright. In such an arrangement, the speed V1 of the can bodies on the conveyor belt 1 is boosted by another conveyor belt 3 to a higher speed V2, in order to create a sufficient gap between the can bodies 2. As already mentioned, this causes problems, as the speed V1 is already very high, being equivalent to e.g. 1000 can bodies per minute (CPM, cans per minute) on the conveyor belt 1.

Figure 2:
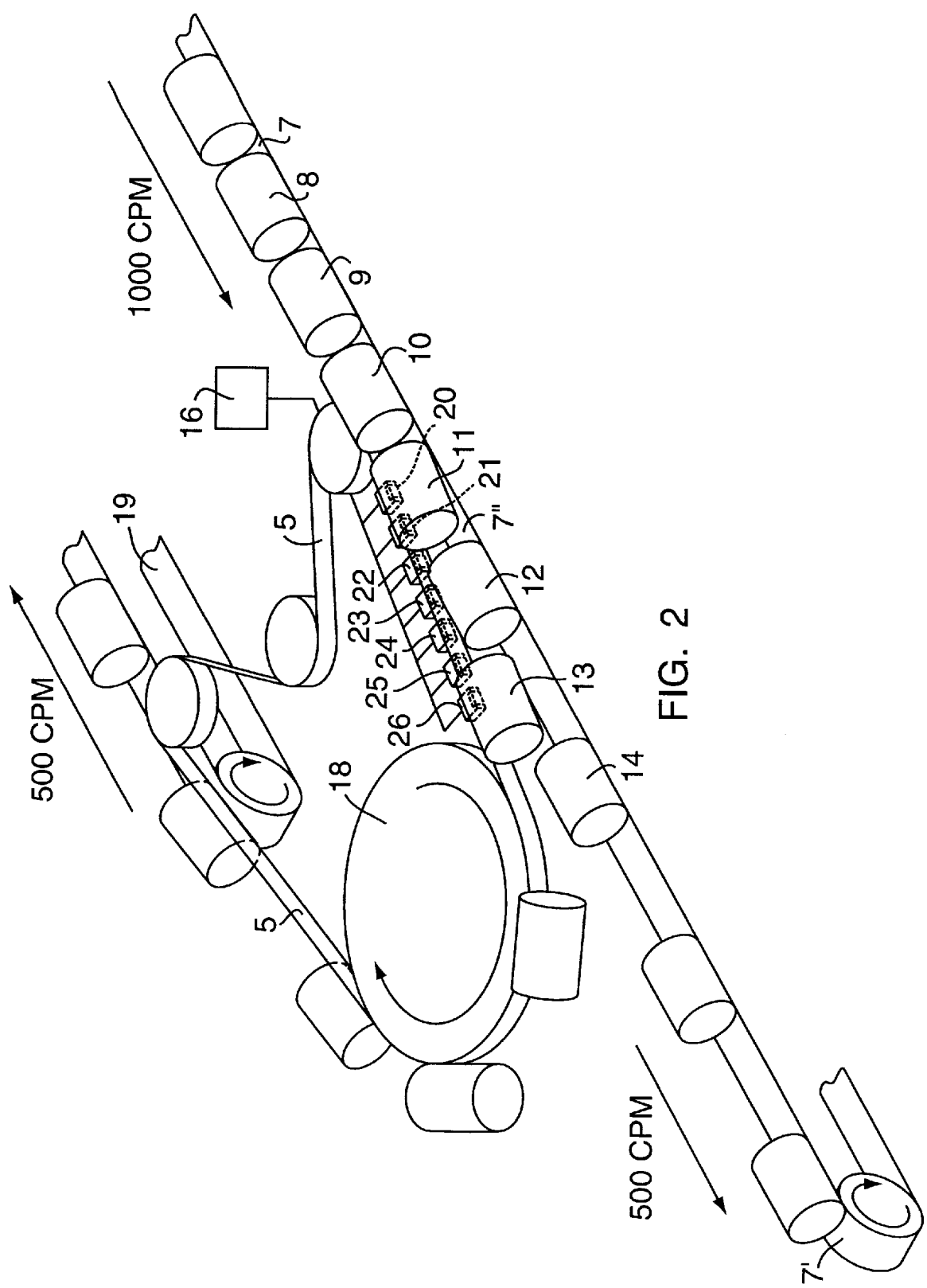
FIG. 2 is a schematic perspective illustration of a first embodiment of the invention.

FIG. 2 shows a first embodiment according to the invention, illustrated schematically in a perspective view. A first conveyor means is illustrated in the form of a conveyor belt 7 on which a series of can bodies, e.g. the can bodies 8, 9 and 10, are being conveyed. The transfer rate of this conveyor belt may for example be the 1000 CPM already mentioned. The can bodies are kept on the belt by magnets located underneath the belt. These are permanent magnets. This type of conveying system is known for can bodies made of sheet metal. Alternatively, other facilities could be provided for fixing the can bodies to the belt 7, e.g. mechanical retainers. In the region 7" of the conveyor belt 7 in which the can body 11 is shown to be located, a further conveyor means is made to pass close to the first conveyor means. In this example, the further conveyor means is in the form of a conveyor belt 5. This conveyor belt 5 extends at right angles to the conveyor belt 7 to come closely adjacent to the belt 7, so that each can body entering the region 7" is laterally touched, or almost touched, by the conveyor belt 5. Beyond the region or conveyor path section 7" in which the conveyor belt 5 comes close to the first conveyor means 7, the conveyor belt 5 forming the second conveyor means gradually diverges from the first conveyor means 7. In the example shown, the conveyor belt 5 then runs round a deflection pulley 18 and as it does so moves away from the first conveyor means 7 altogether. In the region where the conveyor belt 5 is made to pass close to the conveyor belt 7, and also for a certain distance in the following region in which it moves further and further away from the belt 7, electromagnets 20–26 are arranged behind the conveyor belt 5. These electromagnets can be individually triggered by a control unit 16 which is merely represented schematically. In the ensuing path of the conveyor belt 5, permanent magnets are likewise arranged behind the belt to keep the can bodies from falling off. In the region in which the conveyor belt 5 is made to pass close to the conveyor belt 7, can bodies are transferred from the conveyor belt 7 on to the conveyor belt 5. In the example shown, this takes place by selective actuation of the electromagnets 20–26 in succession by means of the control unit 16 so that each can body to be removed from the belt 7 is attracted by the electromagnets with sufficient force to overcome the force of the permanent magnets of the conveyor belt 7. As a result, individual cans from the series of cans on the conveyor belt 7 are transferred on to the conveyor belt 5. Instead of (or in addition to) using electromagnets, transfer to the second conveyor means could be effected by a pneumatic or mechanical action, such as by an air jet or by a mechanical gripper or pushrod for example. In this case, permanent magnets could be provided instead of electromagnets for the second conveyor means 5 as well, as they can then act in conjunction with the force applied pneumatically or mechanically to the body in transferring it from one conveyor means 7 to the other conveyor means 5. Ease of transfer is mainly governed by how close the second conveyor means comes to the can bodies. If the can bodies are actually contacted by the felt 5 in the common conveyor path section of the belts 5 and 7, transfer by magnetic means alone is particularly easy to accomplish.

In the example shown, every other can body is being transferred from the conveyor belt 7 to the conveyor belt 5. The bodies transferred on to the conveyor belt 5 are subsequently discharged on to a further conveyor belt 19, which is likewise equipped with permanent magnets to hold the can bodies. Thus, in this particular mode of operation illustrated as an example, the initial series of can bodies being conveyed on the belt 7 at a rate of 1000 CPM becomes a first series of can bodies which remains on the belt 7 and a second series of can bodies which is passed on to the belt 19. It is obvious that each of the resultant series of can bodies has a transfer rate of only 500 CPM, and a larger gap between the individual can bodies. The speed of the conveyor belts is not increased; that is to say, the 500 CPM series at the discharge end of the belt 7 runs at the speed V1 of the conveyor belt 7, and not at a higher speed V2 as is the case in the state of the art with the arrangement shown in FIG. 1. As the bodies are spaced sufficiently far apart, a belt similar to the belt 4 in FIG. 1 for standing the bodies upright can be placed in the end region 7' of the conveyor belt 7 without any further special measures being necessary. The 500 CPM series of cans permits this; and the relatively low speed V1 allows problem-free transfer of the horizontal can bodies to the belt 4 for standing the bodies upright. In the same way, another conveyor belt 4 for standing the bodies upright can be located in the end region (not shown) of the belt 19, for further handling of this 500 CPM series with the can bodies upright. Thus, by means of the example shown, it is possible to divide the series of can bodies on the conveyor belt into two separate series of can bodies, each travelling at the same speed as the conveyor belt 7.

A further conveyor means could be provided on the other side of the conveyor belt 7, allowing three separate series to be formed. By providing yet another such conveyor means above the conveyor belt 7, four series could be formed. The conveyor planes, or in the case of belt conveyors the planes of the belt surfaces, do not then lie in a common plane or coincide, but intersect, or in the case of the overhead belt lie parallel with one another.

Instead of the illustrated mode of operation in which every other can body is removed from the 1000 CPM stream, the second conveyor means formed by the conveyor belt 5 could also be set up to accept only those can bodies which have been identified by a prior quality inspection as defective, and hence as rejects. In this case the control unit 16 will receive a corresponding instruction from a quality monitoring device, and will only pick off particular individual cans by means of the electromagnets 20–26. These cans can then be fed in a controlled manner into an enclosed collecting bin by the conveyor belt 5, or 19 as the case may be. If the series of cans from which only particular cans have been removed is to be fed by the conveyor belt 7 to a belt 4 on which they are carried upright, the first removal arrangement which has been described for particular cans may be followed by a second similar arrangement which, as shown in FIG. 2, removes every other can from the remaining stream, to create suitable conditions for an arrangement with a conveyor belt 4 as shown in FIG. 1 for standing can bodies upright.

Figure 3:
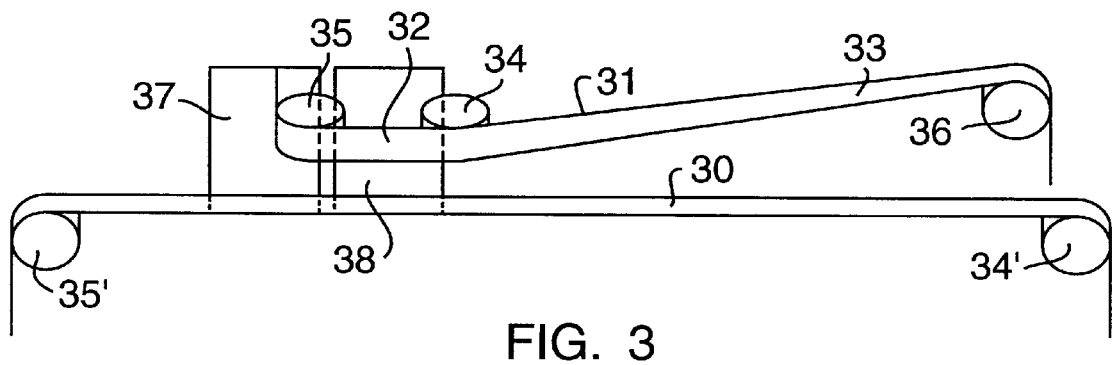
FIG. 3 is a schematic perspective view of a further embodiment of the invention.
Figure 4:
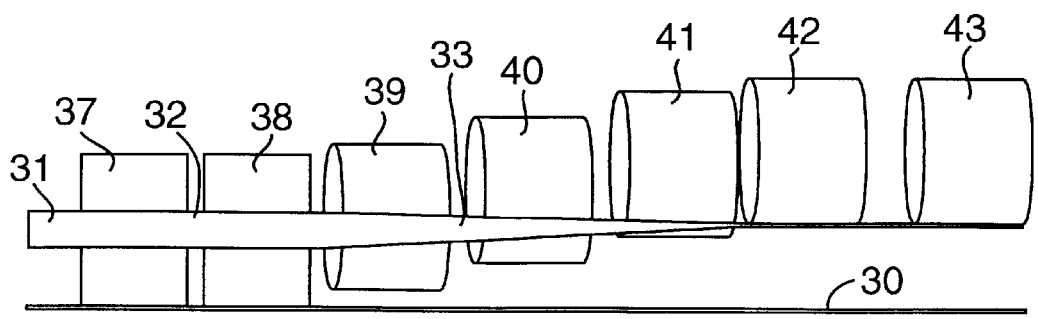
FIG. 4 is a side view of the embodiment shown in FIG. 3.

FIG. 3 is a highly schematic perspective view of a further embodiment of the invention. In this case, just two can bodies 37 and 38 are indicated in outline so that elements lying behind them can still be seen. FIG. 3 shows, as before, a first conveyor means 30, on which a series of container bodies are being conveyed. A second conveyor means 31, also in the form of a conveyor belt, is made to pass close to the belt 30 in the region where the two can bodies 37 and 38 are shown in outline, so that, as in the previous embodiment, this belt 31 may touch the can bodies or pass very close to them. In this region the belt 31 is oriented at right angles to the belt 30; in other words, the axes of the guide pulleys 35 and 34 in this region extend perpendicularly to the axes of the guide pulleys 34' and 35' of the belt 30. After the region in which the belt 31 has passed close to the belt 30 (this region of juxtaposition being designated 32), the belt 31 is made to diverge from the belt 30, and at the same time is twisted with respect to its orientation in the region 32. This can be seen to occur in the region 33, and is due to the fact that the axis of the next deflection pulley 36 of the belt 31 extends approximately parallel with the axis of the deflection pulley 34' of the belt 30. The result is that can bodies which have been transferred to the belt 31 are led away from the belt 30 by lateral divergence and at the same time by undergoing a rotary motion due to the twist of the belt. As in the previous embodiment, the can bodies are preferably held on the belts 30 and 31, in a manner known in itself, by permanent magnets, and in the transfer region 32 by controlled electromagnets, but these are not shown in the schematic illustration in FIG. 3. FIG. 4 shows a side view of the apparatus of FIG. 3, likewise in highly schematic form. The belt 30 is again shown, and also the belt 31 which is made to pass close to the belt 30 and runs at right angles to it. After the region 22 in which can bodies can be transferred to the belt 31, the can bodies which have been transferred are guided away and rotated, as schematically illustrated by the can body outlines 39, 40, 41, 42 and 43.

The arrangements shown in FIG. 3 and FIG. 4 can also be employed so that the series of can bodies conveyed on the belts 30 and 31 are subsequently fed, at the deflection pulleys 34' and 36 respectively, to a conveyor belt 4 which extends upwards, as shown in principle in FIG. 1. It is also possible to operate in the other mode, in which only particular cans are transferred to the belt 31 and are thereby conveyed away to a bin for unusable cans, as has already been described with regard to the preceding embodiment.

If the embodiments which have so far been described are made to run in the opposite direction, it is possible to merge two series of uniformly spaced can bodies to form a single series of can bodies. Successive bodies in each series must be spaced sufficiently far apart to allow another body to be inserted into the gap between them. If the bodies to be merged are not uniformly spaced apart, a detection device must be provided to detect whether a sufficiently large gap is present for a body to be transferred from one conveyor means to the other. Also the speed of one, or both, conveyor means can be varied so that bodies can be precisely positioned with respect to a gap. In other respect the comments made on FIGS. 2 to 8 also apply to the merging of can bodies, although the direction of running of the conveyor means is of course opposite to that which has been described; thus the description from page 4 line 21 to page 10 line 24 also applies to the merging of can bodies.

Figure 5:
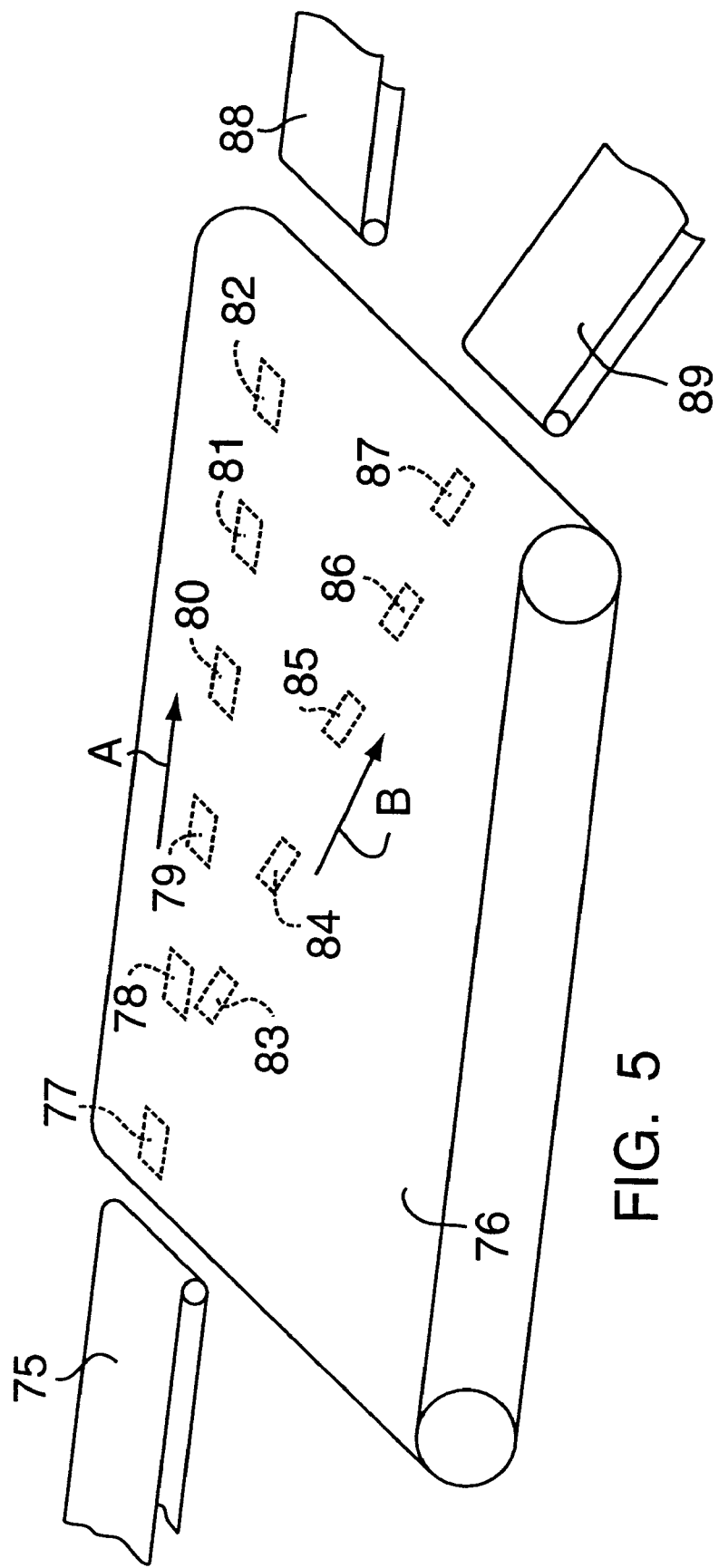
FIG. 5 is a perspective view of a further embodiment of the invention.

FIG. 5 shows schematically an apparatus for carrying out another method for separating a stream of can bodies into two streams of bodies, or for merging two streams of can bodies into one. For the separation of a single stream, the running direction of the conveyor means in FIG. 5 is presumed to be from left to right. A first conveyor belt 75 brings the series of can bodies which are to be separated to a separating conveyor means 76 which is formed by a wide conveyor belt. Controllable holding means 77–87 e.g. in the form of electromagnets are arranged preferably underneath the belts 76. By actuating the magnets appropriately, a body can be carried by the belt 76 either along the path A or along the path B, and can be received by the corresponding conveyor belt 88 or 89, which may be provided with e.g. permanent magnets as holding means, which also applies to the belt 75.

Where two series of can bodies on the belts 88 and 89 are brought together into a single series on the belt 75, all belts in the figure are reversed so as to run from right to left. In order to be merged, the series of can bodies on the belts 88 and 89 must be delivered in a synchronized manner and with the necessary gaps, so that the two series of can bodies can be brought together into a single series in the manner of a zip fastener, to be conveyed away by the belt 75.

What is claimed is:

1. Method for separating a series of container bodies which are transported on a first conveyor means into at least two separate series of container bodies, in which at least one second conveyor means operated at substantially the same speed as the first conveyor means is made to pass close to the first conveyor means along a section of conveyor path and then to diverge therefrom, such that the conveying plane of one conveyor means does not coincide with the conveying plane of the other conveyor means at least in said section of conveyor path, and by means of a controllable application of force individual bodies are transferred from the first conveyor means to the second conveyor means, on which said bodies are held and are successively removed from the series by the divergence of the path of the second conveyor means from the first conveyor means, the first conveyor means being formed by a first conveyor belt extending in a straight line in the region of separation, characterized in that the bodies are held on the first conveyor belt by permanent magnets or mechanically, in that the second conveyor means is formed by a second conveyor belt behind which a plurality of electromagnets or permanent magnets are arranged one after the other in the conveying direction, and in that the electromagnets are actuated by a control unit so that the force tending to hold the bodies on the first conveyor belt is overcome or so that the bodies are transferred to the permanent magnets of the second conveyor belt by controlled application of mechanical force so that the holding force of the first conveyor belt is overcome, thereby causing individual bodies to be transferred to the second conveyor belt.

2. Method according to claim 1, characterized in that the successive removal from the series takes place in a section of the conveyor path whose length is equal to the length of a plurality of bodies.

3. Method for bringing together at least two separate series of container bodies which are transported on at least two conveyor means to form a single series of container bodies, in which one conveyor means is made to pass close to the other conveyor means along a section of conveyor path, such that the conveying plane of one conveyor means does not coincide with the conveying plane of the other conveyor means at least in said section of conveyor path, and by means of a controllable application of force individual bodies are transferred from one conveyor means to the other conveyor means, on which these bodies are held, and in which one conveyor means is formed by a conveyor belt, characterized in that the bodies are held on one conveyor means by permanent magnets and in that the other conveyor means is formed by a second conveyor belt behind which a plurality of electromagnets are arranged and these electromagnets are actuated by a control unit so that the holding force of the permanent magnets is overcome, causing the bodies to be transferred to the second conveyor belt.

4. Method according to claim 1, characterized in that the transfer from the first conveyor means to the second conveyor means is assisted by the application of mechanical or pneumatic force to the body.

5. Method according to claim 3, characterized in that the transfer from the first conveyor means to the second conveyor means is assisted by the application of mechanical or pneumatic force to the container body.

6. Method for bringing together at least two separate series of container bodies which are transported on at least two conveyor means to form a single series of container bodies, in which one conveyor means is made to pass close to the other conveyor means along a section of conveyor path, such that the conveying plane of one conveyor means does not coincide with the conveying plane of the other conveyor means at least in said section of conveyor path, and by means of a controllable application of force individual bodies are transferred from one conveyor means to the other conveyor means, on which these bodies are held, and in which one conveyor means is formed by a conveyor belt, wherein the bodies are held on one conveyor means by permanent magnets and in that the other conveyor means is formed by a second conveyor belt behind which a plurality of electromagnets are arranged and these electromagnets are actuated by a control unit so that the holding force of the permanent magnets is overcome, causing the bodies to be transferred to the second conveyor belt, and wherein the second conveyor means includes a conveyor belt which is twisted after said section of conveyor path with respect to its orientation in that section or twisted before said section of conveyor path with respect to its orientation in that section.

7. Method for bringing together at least two separate series of container bodies which are transported on at least two conveyor means to form a single series of container bodies, in which one conveyor means is made to pass close to the other conveyor means along a section of conveyor path, such that the conveying plane of one conveyor means does not coincide with the conveying plane of the other conveyor means at least on said section of conveyor path, and by means of a controllable application of force individual bodies are transferred from one conveyor means to the other conveyor means, on which these bodies are held, and in which one conveyor means is formed by a conveyor belt, and wherein the bodies are held on one conveyor means by permanent magnets and the other conveyor means is formed by a second conveyor belt behind which a plurality of electromagnets are arranged and these electromagnets are actuated by a control unit so that the holding force of the permanent magnets is overcome, causing the bodies to be transferred to the second conveyor belt, and wherein the second conveyor means includes a conveyor belt which is deflected, together with the bodies held thereon, after or before said section of conveyor path.

8. Method for separating a series of container bodies which are transported on a first conveyor means into at least two separate series of container bodies, in which at least one second conveyor means operated at substantially the same speed as the first conveyor means is made to pass close to the first conveyor means along a section of conveyor path and then to diverge therefrom, such that the conveying plane of one conveyor means does not coincide with the conveying plane of the other conveyor means at least in said section of conveyor path, and by means of a controllable application of force individual bodies are transferred from the first conveyor means to the second conveyor means, on which the said bodies are held and are successively removed from the series by the divergence of the path of the second conveyor means from the first conveyor means, the first conveyor means being formed by a first conveyor belt extending in a straight line in the region of separation, and wherein the bodies are held on the first conveyor belt by permanent magnets or mechanically, the second conveyor means is formed by a second conveyor belt behind which a plurality of electromagnets or permanent magnets are arranged one after the other in the conveying direction, and the electromagnets are actuated by a control unit so that the force tending to hold the bodies on the first conveyor belt is overcome or so that the bodies are transferred to the permanent magnets of the second conveyor belt by controlled application of mechanical force so that the holding force of the first conveyor belt is overcome, thereby causing individual bodies to be transferred to the second conveyor belt, and wherein the second conveyor means includes a conveyor belt which is twisted after said section of conveyor path with respect to its orientation in that section or twisted before said section of conveyor path with respect to its orientation in that section.

9. Method for separating a series of container bodies which are transported on a first conveyor means into at least two separate series of container bodies, in which at least one second conveyor means operated at substantially the same speed as the first conveyor means is made to pass close to the first conveyor means along a section of conveyor path and then to diverge therefrom, such that the conveying plane of one conveyor means does not coincide with the conveying plane of the other conveyor means at least in said section of conveyor path, and by means of a controllable application of force individual bodies are transferred from the first conveyor means to the second conveyor means, on which the said bodies are held are successively removed from the series by the divergence of the path of the second conveyor means from the first conveyor means, the first conveyor means being formed by a first conveyor belt extending in a straight line in the region of separation, wherein the bodies are held on the first conveyor belt by permanent magnets or mechanically, the second conveyor means is formed by a second conveyor belt behind which a plurality of electromagnets or permanent magnets are arranged one after the other in the conveying direction, the electromagnets are actuated by a control unit so that the force tending to hold the bodies on the first conveyor belt is overcome or so that the bodies are transferred to the permanent magnets of the second conveyor belt by controlled application of mechanical force so that the holding force of the first conveyor belt is overcome, thereby causing individual bodies to be transferred to the second conveyor belt, and wherein the second conveyor means includes a conveyor belt which is deflected, together with the bodies held thereon, after, or before, said section of conveyor path.

10. Apparatus for separating a series of container bodies with a first conveyor means for transporting the series of bodies; a second conveyor means which extends adjacent to the first conveyor means along a section of conveyor path and diverges from the first conveyor means after said section, such that the conveying plane of one conveyor means does not coincide with the conveying plane of the other conveyor means at least in said section of conveyor path; and a controllable transfer device for shifting individual bodies from the first conveyor means to the second conveyor means, the first conveyor means being formed by a first conveyor belt characterized in that the bodies are held on the first conveyor belt by permanent magnets or mechanically, and in that the other conveyor means is formed by a second conveyor belt behind which a plurality of electromagnets are arranged or permanent magnets with associated pneumatic or mechanical means acting on the bodies are arranged, and are operable by a control unit so that the force tending to hold the bodies on the first conveyor belt can be overcome, thereby causing individual bodies to be transferred to the second conveyor belt.

11. Apparatus according to claim 10, characterized in that, in addition to the transfer device, a device acting mechanically or pneumatically on the bodies is provided.

12. Apparatus for bringing together at least two separate series of container bodies which are transported on at least two conveyor means to form a single series of container bodies, in which one conveyor means is made to pass close to the other conveyor means along a section of conveyor path, such that the conveying plane of one conveyor means does not coincide with the conveying plane of the other conveyor means at least in said section of conveyor path, and in which a controllable transfer device is provided for shifting individual bodies from one conveyor means to the other conveyor means, one conveyor means being formed by a conveyor belt, characterized in that the bodies are held on the conveyor belt by permanent magnets, and in that the other conveyor means is formed by a second conveyor belt behind which a plurality of electromagnets are arranged, and are operable by a control unit so that the holding force of the permanent magnets can be overcome, thereby causing bodies to be transferred to the second conveyor belt.

13. Apparatus according to claim 12, characterized in that, in addition to the transfer device, a device acting mechanically or pneumatically on the bodies is provided.

* * * * *